US006656334B2

(12) United States Patent
Tseng et al.

(10) Patent No.: US 6,656,334 B2
(45) Date of Patent: Dec. 2, 2003

(54) MODIFIED ELECTROLYSIS CELL AND A HOUSING FOR THE SAME

(75) Inventors: Anthony Tseng, Monterey Park, CA (US); Waydon Tseng, Monterey Park, CA (US)

(73) Assignee: Skydon Corp., City of Industry, CA (US)

(*) Notice: Subject to any disclaimer, the term of this patent is extended or adjusted under 35 U.S.C. 154(b) by 60 days.

(21) Appl. No.: 09/911,124

(22) Filed: Jul. 23, 2001

(65) Prior Publication Data

US 2003/0015418 A1 Jan. 23, 2003

(51) Int. Cl.[7] .................................................. C25B 9/00

(52) U.S. Cl. ..................... 204/276; 204/242; 204/275.1

(58) Field of Search ................................. 204/242, 252, 204/271, 275.1, 276

(56) References Cited

U.S. PATENT DOCUMENTS

| | | | | | |
|---|---|---|---|---|---|
| 3,623,969 | A | * | 11/1971 | Hushihara | 204/271 |
| 4,089,768 | A | * | 5/1978 | Fischer et al. | 204/228.6 |
| 4,257,864 | A | * | 3/1981 | Gacki | 204/213 |
| 4,289,599 | A | * | 9/1981 | Fushihara | 204/240 |
| 5,060,990 | A | * | 10/1991 | Smith et al. | 292/91 |
| 5,846,390 | A | * | 12/1998 | Eki et al. | 204/229.6 |
| 5,928,481 | A | * | 7/1999 | Briggs | 210/192 |
| 6,358,395 | B1 | * | 3/2002 | Schorzman et al. | 205/701 |

* cited by examiner

*Primary Examiner*—Nam Nguyen
*Assistant Examiner*—Brian L Mutschler
(74) *Attorney, Agent, or Firm*—Maria Erlinda C. Sarno

(57) ABSTRACT

This invention relates to modifying a process cell that needs periodic replacement such as the electrolysis cell shown to enable quick connect/disconnect with minimal process downtime. The claimed invention not only modifies the design of the cell but also proposes a housing with a separate compartment for the cell to isolate this from the other components of the system making it easier to replace the cell without the need to disturb the other components.

21 Claims, 10 Drawing Sheets

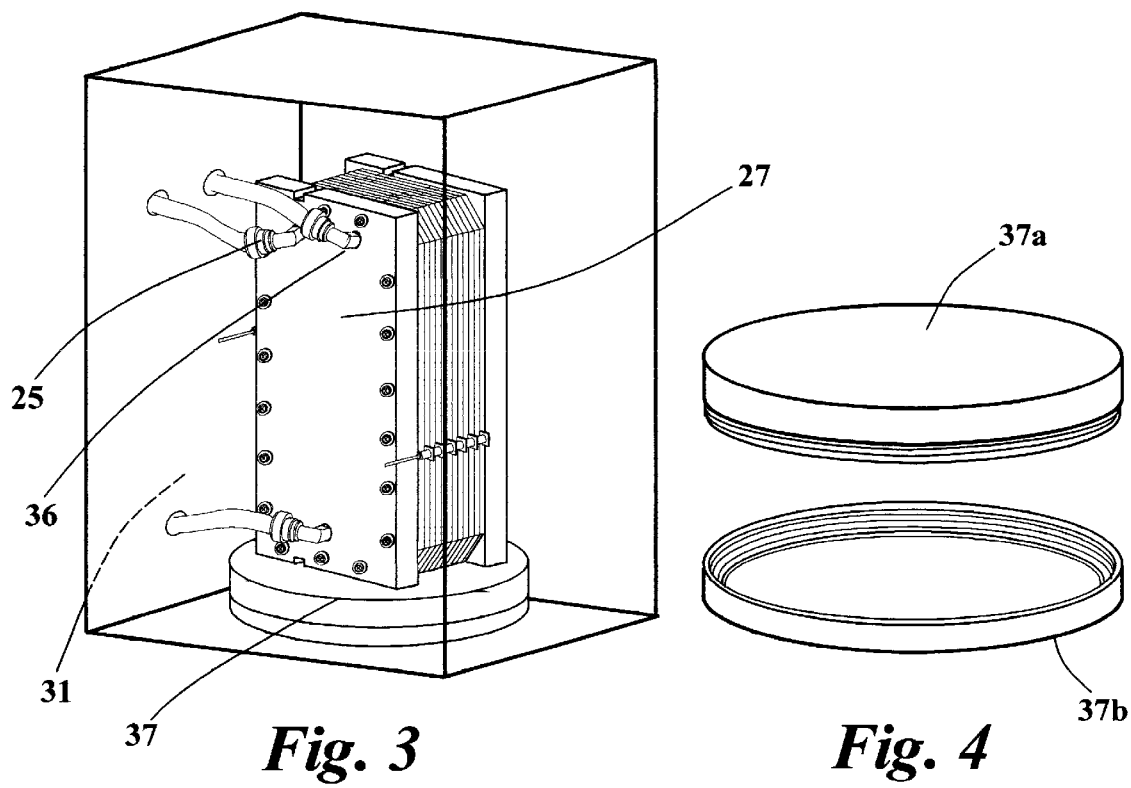
*Fig. 3*  *Fig. 4*
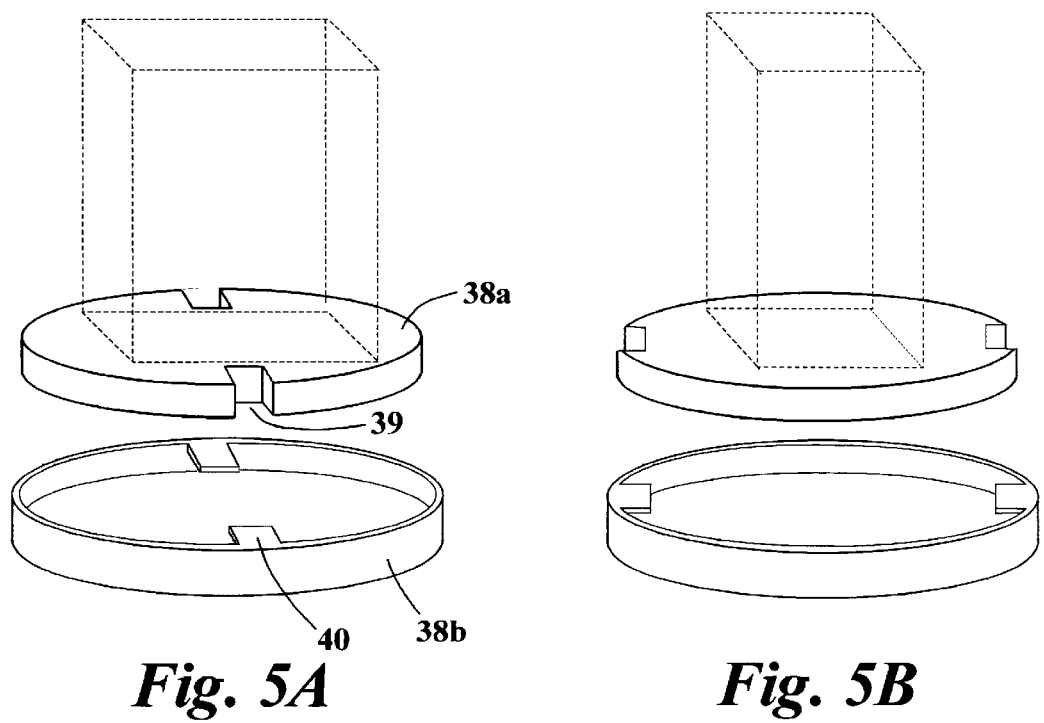
*Fig. 5A*  *Fig. 5B*

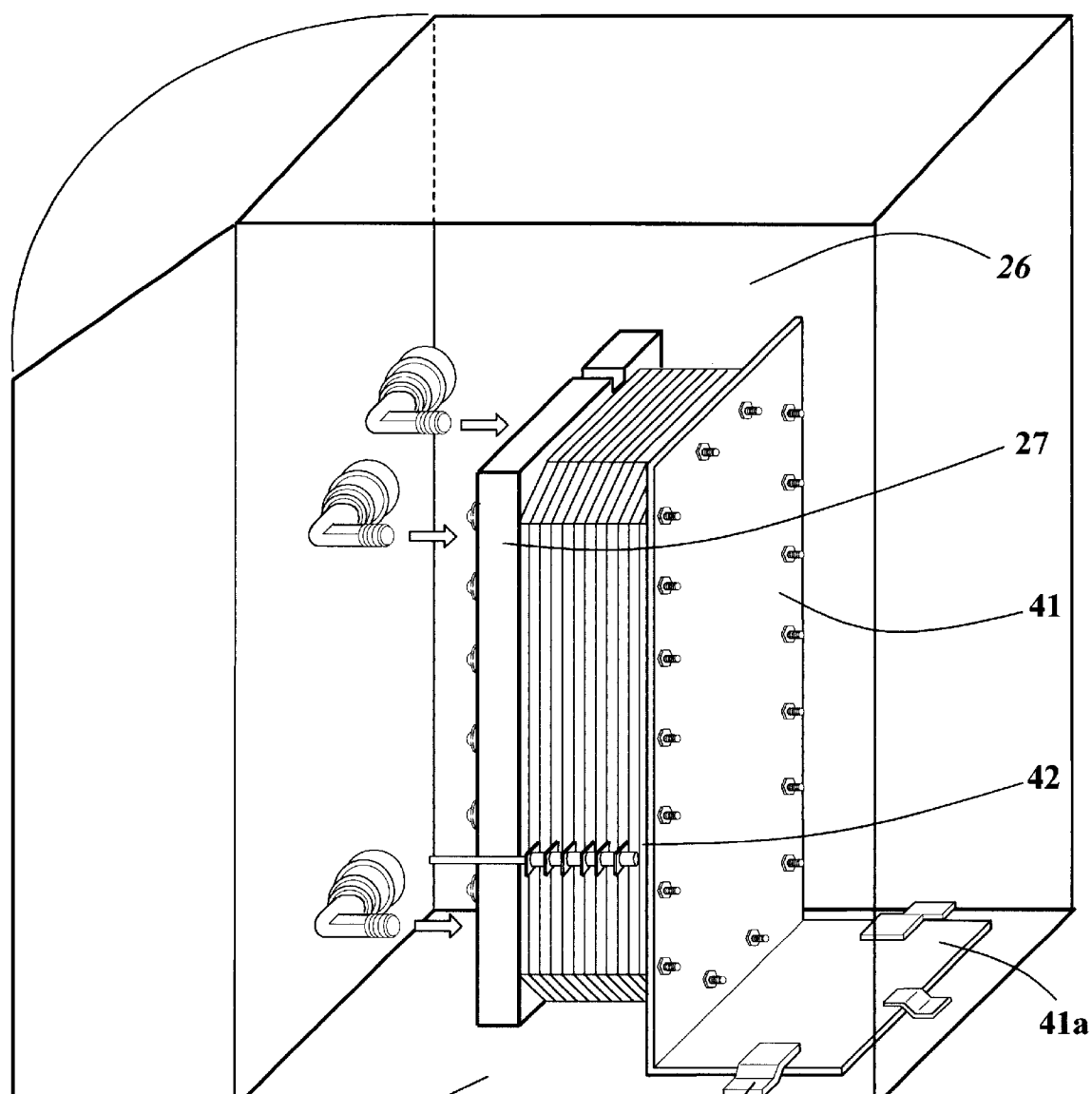
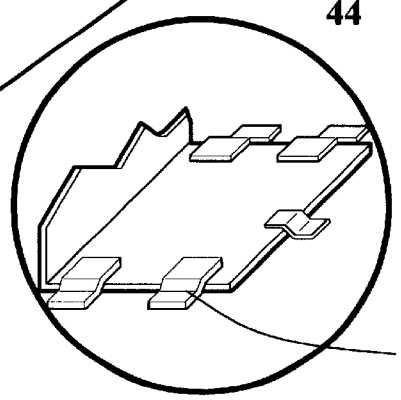
Fig. 7A
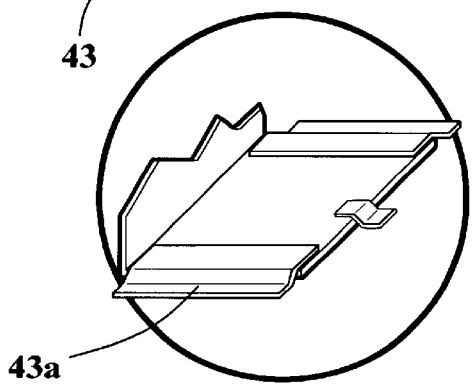
Fig. 7B
Fig. 7

MODIFIED ELECTROLYSIS CELL AND A HOUSING FOR THE SAME

BACKGROUND

The process for electrolyzed water is known and devices employing this process are commercially available both in portable and commercial sizes. Electrolyzed water is produced by electrolysis, a process involving the passage of an electric (D.C.) current through a mixture of potable water and brine, a solution of water and sodium chloride. The electrolysis device normally used is a cell made up of a chamber or a series of chambers with a membrane separator on each chamber.

The electrolysis cell is part of an electrolysis system for producing electrolyzed water. In the process of producing electrolyzed water, potable water is mixed with salt water or brine at a desired ratio and the resulting mixture is fed into the electrolysis cell, hereinafter also referred to simply as cell. Consequently, upon prolonged usage, electrodeposits, usually of calcium and magnesium ions are deposited and build up as scales on the electrolysis cell, thereby requiring periodic cleaning and/or replacement. While periodic cleaning can be accomplished by passage of cleaning solutions accompanied by rerouting the supply and exit lines with the use of valves, these processes merely prolong the life of the cell but has not removed the necessity of replacing the electrolysis cell. Replacement becomes necessary after a period of time because the electrodes themselves erode and become inefficient. This invention relates to an improvement in the design of the electrolysis cell for the production of electrolyzed water, other products of electrolysis, and on process cells involving the passage of electric current and on the housing enclosing the components of these electrolysis systems and other process systems. Current enclosed electrolysis systems such as those used for producing electrolyzed water are housed with the electrolysis cell and other components of the system in one compartment. The compartment is typically six walled with one wall or base holding most of the parts of the system and five walls or panels attaching together usually by means of screws, thereby enclosing the system. It is tedious to replace the electrolysis cell with the current housing. In a commercial unit, to replace the electrolysis cell, one has to unscrew at least one side panel of the housing adjacent to the wall attached to the cell. However, to do the replacement with less time, preferably two, a side and a top panel are removed. This facilitates access to the electrolysis cell. Once the walls are removed, one has to disconnect the cell from the compartment, the power source, system's other components and from all the tubings or pipings connected to its entry and exit ports. This replacement requires downtime which may discourage or procrastinate the replacement of the cell, thereby affecting its performance both in flow characteristics and efficiency.

Current electrolysis cells addressed by the claimed invention, usually have a front panel and a back panel for holding the anode and the cathode chambers. The front panel usually has the connectors for the entrance and exit ports. The back panel may be a plain block panel or may have holes for attaching the cell to a holder to keep the cell in place. The present means for attachment is preferably by the use of self tapping screws which requires time for removal and replacement.

It is therefore an object of this invention to provide a housing or cabinet having a separate accessible compartment for the cell where one can immediately replace the cell without disturbing the other components of the electrolysis system.

It is also an object of this invention to provide different configurations of the housing or cabinet that are equally applicable for facilitating the replacement of the cell.

It is a further object of the invention to provide a modified electrolysis cell that allows quick methods for fastening and detaching the cell from the holder or the compartment that is enclosing the cell to reduce replacement downtime for the system.

BRIEF DESCRIPTION OF THE DRAWING

FIG. 3 is a perspective view of an electrolysis cell in a platform.

FIG. 4 is a perspective view of a screw-on platform.

FIGS. 5A and 5B are perspective views of a twist and lock platform.

FIG. 7 shows another design for a quick disconnect/connect electrolysis cell.

FIGS. 7A and 7B show alternate designs for the tracks or clip-ons holding the electrolysis cell.

SUMMARY OF THE INVENTION

This invention relates to a modified electrolysis cell and a housing or cabinet for an electrolysis system. The examples and illustrations herein use the electrolysis system for producing electrolyzed water. A modified electrolysis cell generally comprises an anode chamber or a series of anode chambers and a cathode chamber or a series of cathode chambers, each chamber separated by a membrane, the chambers held together by a front panel and a rear panel having as improvement, a platform holding the electrolysis cell, the platform having a male member attached to the electrolysis cell and a matching female member connecting to the male member by a screw-on mechanism or a twist and lock mechanism. An alternative modification comprises an anode chamber or a series of anode chambers and a cathode chamber or a series of cathode chambers, each chamber separated by a membrane, the chambers held together by a front panel and a rear panel, the front panel having connectors for the entrance and exit ports, the improvement comprising an L shaped rear panel having a vertical and a horizontal member, the horizontal member securing to a track or a clip-on on a cell holder to keep the cell in place. Instead of an L shaped rear panel, the rear panel can be designed to have a hook on one end and an inverted L on the other end for attachment by slipping into receiving brackets on a cell holder or on a wall of a compartment enclosing the electrolysis cell.

A commercial housing for the electrolysis cell comprises a main compartment enclosing components of an electrolysis system except an electrolysis cell, the main component having six walls, a top wall, a bottom wall and four side panels; an optional second compartment enclosing a power source; an isolated third compartment enclosing the electrolysis cell separated from the main and second compartment by a wall, the isolated third compartment having at least five walls, a top wall, a bottom wall, three side panels, an open side for easily reaching to and grasping on the electrolysis cell, the open side having an optional door to open or close the third compartment; means for communicating the electrolysis cell to the components of the electrolysis system; and, means for attaching the electrolysis cell to the isolated third compartment.

A portable housing for an electrolysis system usually used in the home for drinking water comprises a main compartment having a front panel and a back panel enclosing components of an electrolysis system except an electrolysis cell; a second compartment enclosing a filter member; a third compartment enclosing the electrolysis cell separated from the main and second compartment, the third compartment having an optional door; means for communicating the electrolysis cell to the components of the electrolysis system; and, means for attaching the electrolysis cell to the third compartment.

DETAILED DESCRIPTION OF THE INVENTION

Figure 1:
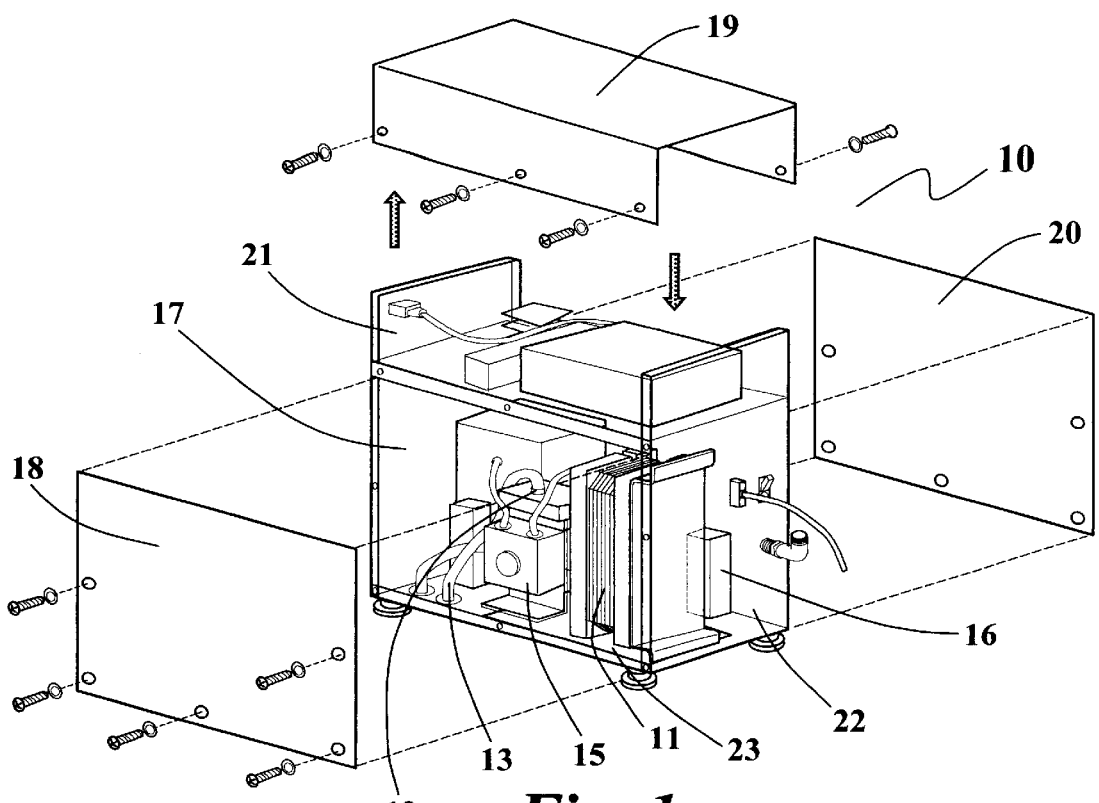
FIG. 1 is an expanded view of a typical housing or cabinet for a commercial electrolysis system showing the panels that need detachment to access the electrolysis cell.
Figure 1A:
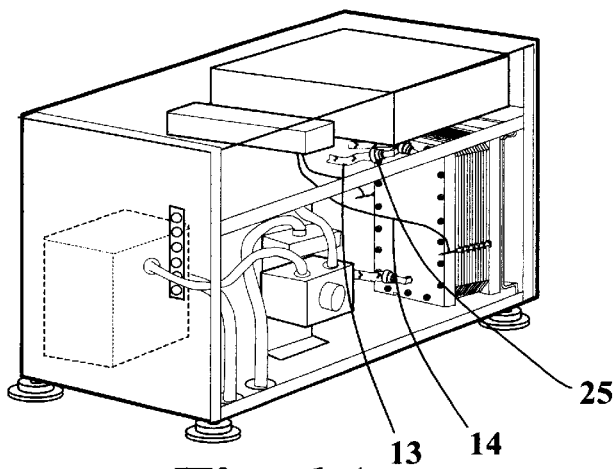
FIG. 1A is a perspective view of a commercial electrolysis system.
Figure 1B:
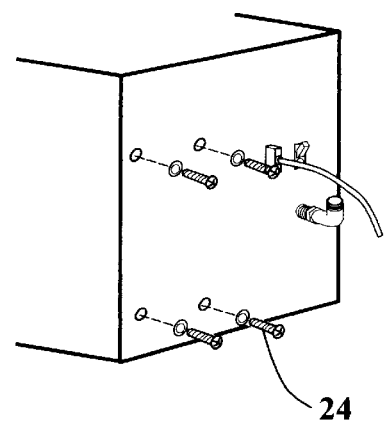
FIG. 1B is a rear view of the commercial electrolysis system.
Figure 1C:
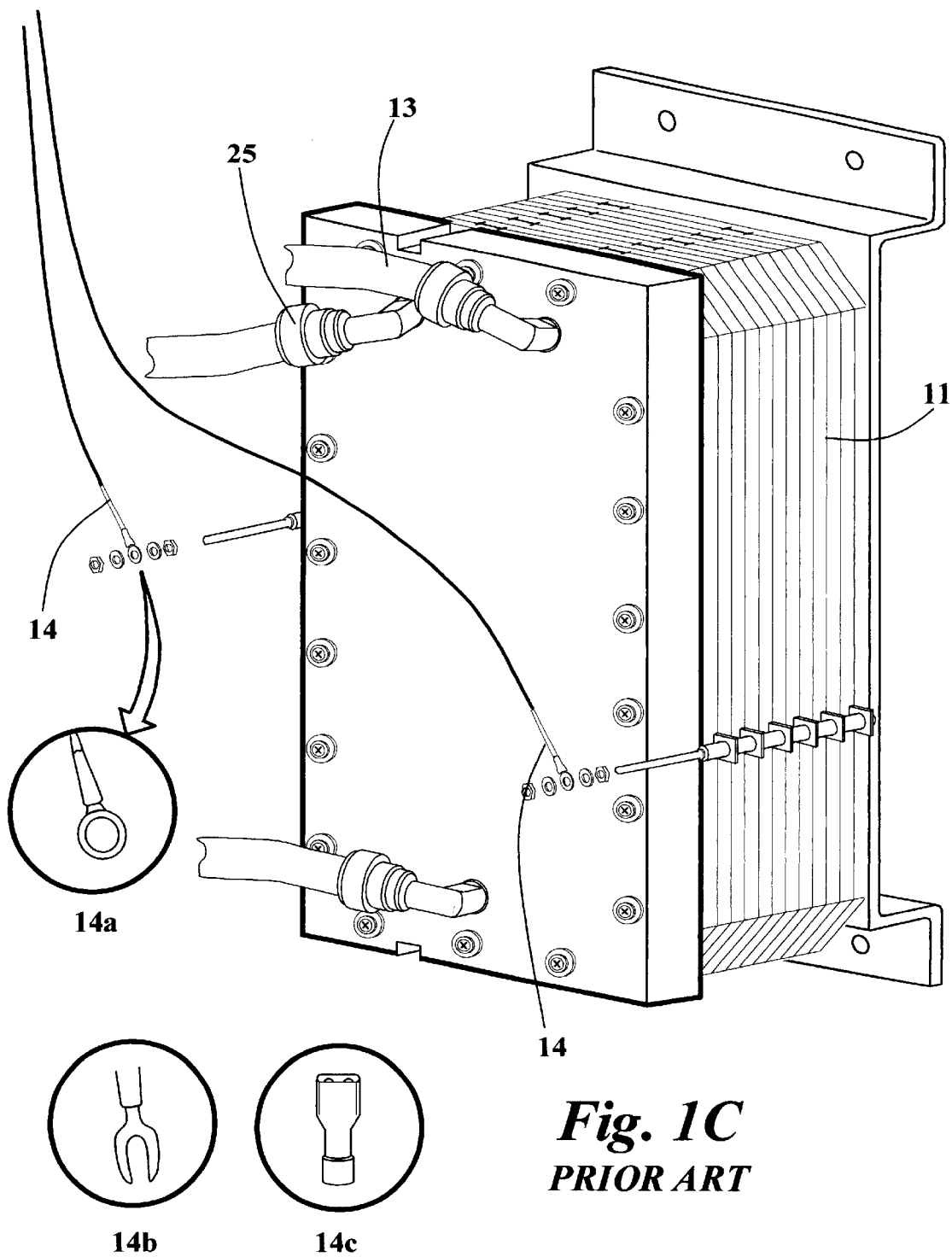
FIG. 1C is a perspective view of a typical electrolysis cell.

This invention relates to a modified electrolysis cell and a housing or cabinet for an electrolysis system. However, the teachings of this invention, although illustrated for the production of electrolyzed water, equally applies to other electrolysis cells used for producing other products of electrolysis and for process cells involving the passage of electric current through the cell so long as these require periodic replacements from the rest of the system components. A process for producing electrolyzed water employs an electrolysis cell by applying a direct current through a pair of electrodes in a cell fed with tap water and saltwater. In this process, electrodeposits, mainly consisting of calcium and magnesium deposits build up in the electrolysis cell despite periodic cleaning during its operation. A typical commercial cabinet or housing 10 for the electrolysis system such as one sold by Toyo Systems USA, Inc., 18725 E. Gale, Ste. 100, City of Industry, Calif., is shown in FIG. 1. The same source sells the electrolysis system and also sells the electrolysis cell as a stand alone unit. As shown, the electrolysis cell 11 along with the valves 12, tubings 13, electrical connectors 14, brine pump 15, mixing chambers 16, power source and other accessories referred to simply herein as components of the electrolysis system, are all confined in a single main compartment 17 which is usually enclosed by six walls or panels, 18, 19, 20, 21, 22, and 23. The housing or cabinet is usually made of metal or hard plastic. In the present system, in order to get into the electrolysis cell 11, one has to detach or unscrew at least one side panel, the panel adjacent to the wall holding the electrolysis cell, which in FIG. 1 is identified as 18. However, depending upon the orientation of the electrolysis cell, other panels may need to be detached or unscrewed. For ease of reaching into the electrolysis cell 11, in the design shown in FIG. 1, opening the top panel, herein identified as 19 with a side panel 18 or 20 is preferable. In the present system, the electrolysis cell is usually attached to a wall by screws 24 as shown in FIG. 1B. To remove and replace the electrolysis cell, one has to additionally detach the cell from a wall as shown in FIGS. 1A and 1B and from the tubings 13 connected to connectors 25 found on one side or panel of the electrolysis cell 11 as shown in FIGS. 1A and 1C and also disconnect the electrical connectors 14 shown in FIG. 1C from the cell. Because of the tediousness and time required to replace the electrolysis cell, one usually delays its replacement by acceding to a slower flow rate resulting in lengthier times to produce electrolyzed water, which compromises the efficiency of the system.

Figure 2:
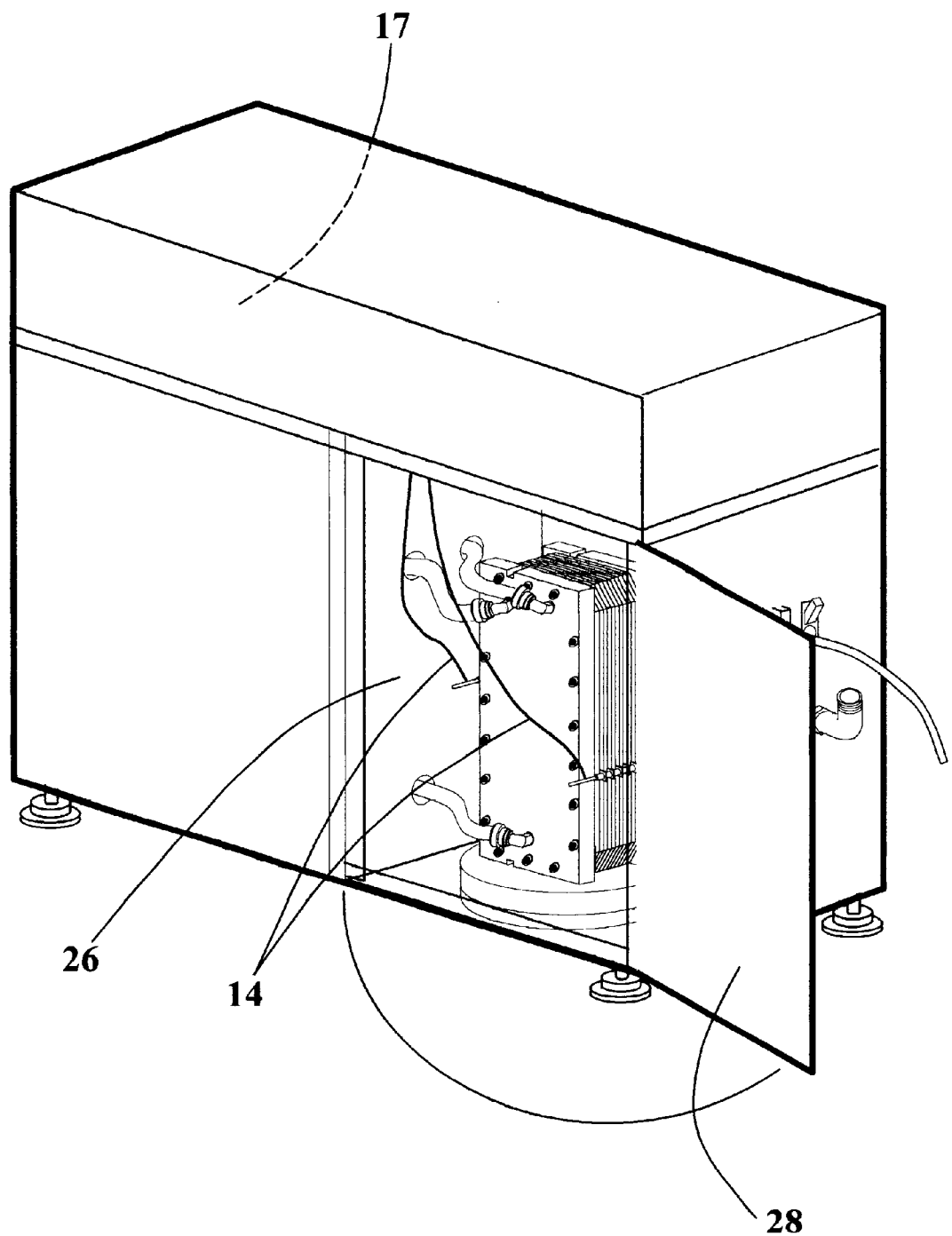
FIG. 2 is a perspective view of an electrolysis cell housed in a separate compartment with an optional swinging door as proposed by the invention.
Figures 2A, 2B:
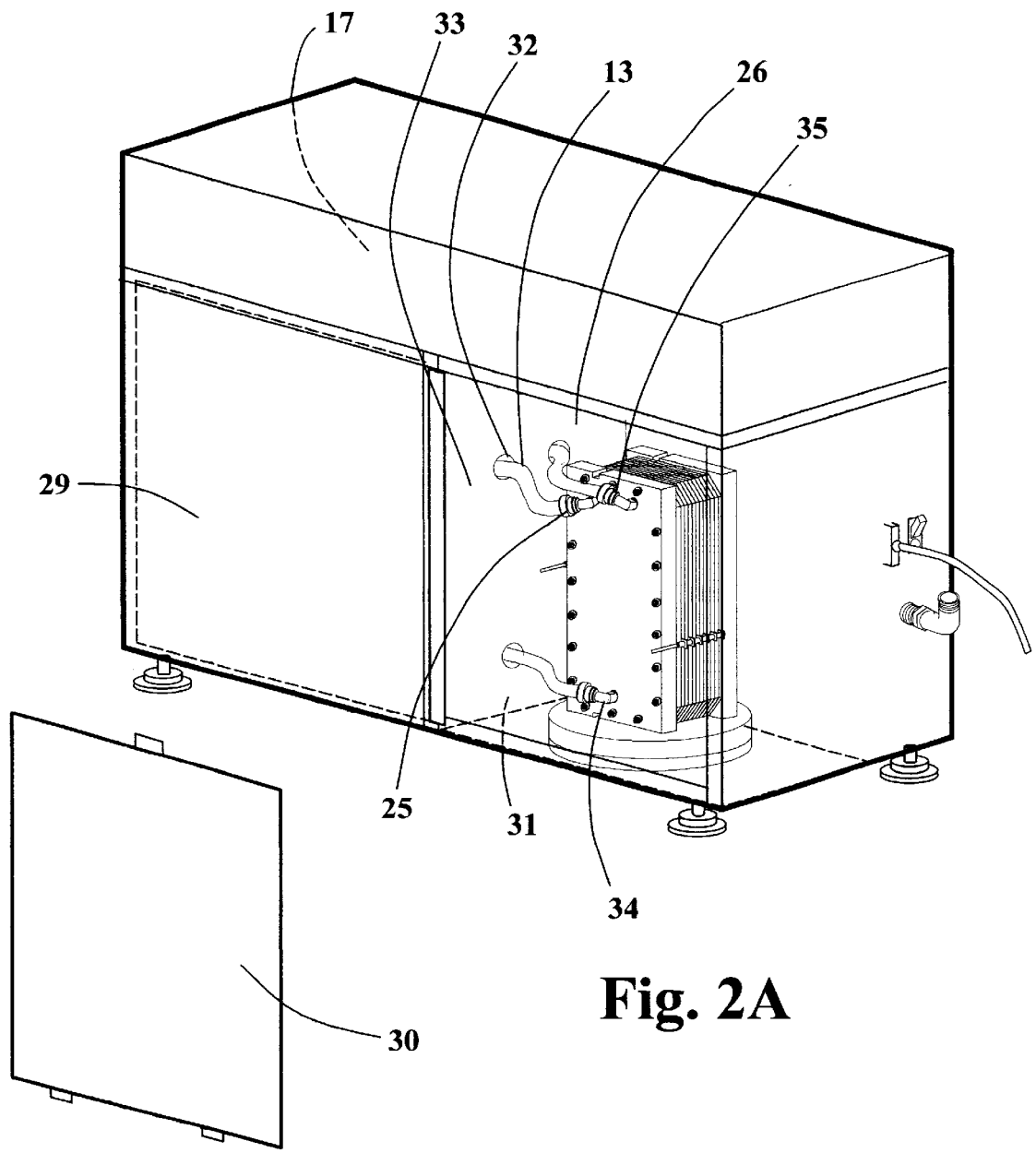
FIG. 2A is a perspective view of an electrolysis cell housed in a separate compartment with an optional sliding door.
FIG. 2B is a perspective view of a clip-on door as alternative to a swinging or sliding door.

The modified electrolysis cell and housing for this system are shown in FIGS. 2–8. FIG. 2 shows the main concept for the housing. The housing or cabinet must have a separate compartment for the cell isolated from the different components of the electrolysis system. FIGS. 3, 4, 5A, 5B, 7 and 8 show different designs for a modified electrolysis cell to allow quick connect/disconnect mechanisms thereby minimizing downtime in replacing the electrolysis cell. As shown in FIG. 2, the electrolysis cell 11 is isolated and enclosed in a separate compartment 26 distinct from the main compartment 17 which encloses the other components such as the valves 12, tubings 13, brine pump 15, mixing chamber 16 and the power source if the latter is not enclosed in another separate compartment. FIG. 2 shows an optional swinging door 28 for closing and opening the compartment 26 housing the electrolysis cell. It is preferred to enclose the electrolysis cell during the operation to keep the cell from airborne contaminants such as dust, prevent tampering, and ensure safety from accidental touching of the electrical connectors 14 while electrolysis is going on. FIGS. 2A and 2B shows alternatives to a swinging door such as a sliding door 29 and a clip-on door 30 shown respectively. The doors are usually made of the same material as the housing. For the clip-on door, the front lateral sides of the open side 31 of compartment 26 should have a protruding hinge (not shown) for the clips to grasp on. This claimed housing removes the trouble of opening the panels of the main compartment to reach into the cell, a problem existing with the current cabinets or housing. To facilitate removal of the cell, the compartment 26 for the electrolysis cell 11 has openings 32 on the side 33 facing and common with the main compartment 17 to accommodate and allow the tubings 13 from the main compartment to couple with the connectors 25 located on the entrance 34 and exit ports 35 of the electrolysis cell. This concept of having a separate isolated compartment for the electrolysis cell is applicable for both the current and the claimed modified electrolysis cells.

Figure 6A:
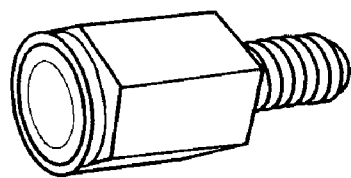
FIGS. 6A, 6B and 6C show alternate connectors for the entrance and exit ports of the electrolysis cell.
Figure 6B:
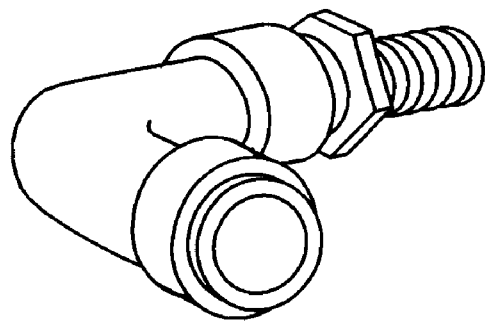
Figure 6C:
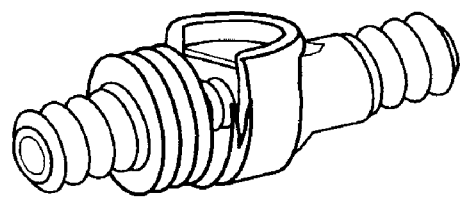

FIG. 3 shows the preferred connectors 25 for use with the claimed modified electrolysis cells. These connectors are usually attached to a front side panel 27 of the electrolysis cell. The front side 27 having the connectors are preferably placed facing the open side 31 of the compartment. The connectors 25 are preferably those that can quickly connect and disconnect such as the snap in elbow connectors 36 sold by Omega Engineering, Inc., One Omega Drive, P.O. Box 4047, Stamford, Conn. 06907. Other typical forms of connectors that can be used are shown in FIGS. 6A, 6B and 6C. Examples are a quick connect fitting (FIG. 6A) from hose-andfitting.com; MES-Male Elbow Swivel (FIG. 6B) from Parker Fluid Connectors, Parflex Division, Parker Hannifin Corporation, Ravenna, Ohio; and Quick Disconnect Couplings (FIG. 6C) from Omega Engineering, Inc.

To disconnect the electrical connectors 14 from the current electrolysis cell as shown in FIG. 1C, one has to unscrew the screws in front of a ring terminal 14a connector before the latter can be removed. In the claimed modified cell of the claimed invention, a terminal spade 14b connector or a quick disconnect such as that shown in 14c is used so it can be disconnected by simply loosening the screws or by unsnapping the connectors, respectively. These connectors are available at Radio Shack and other electronic supply stores.

Figure 8:
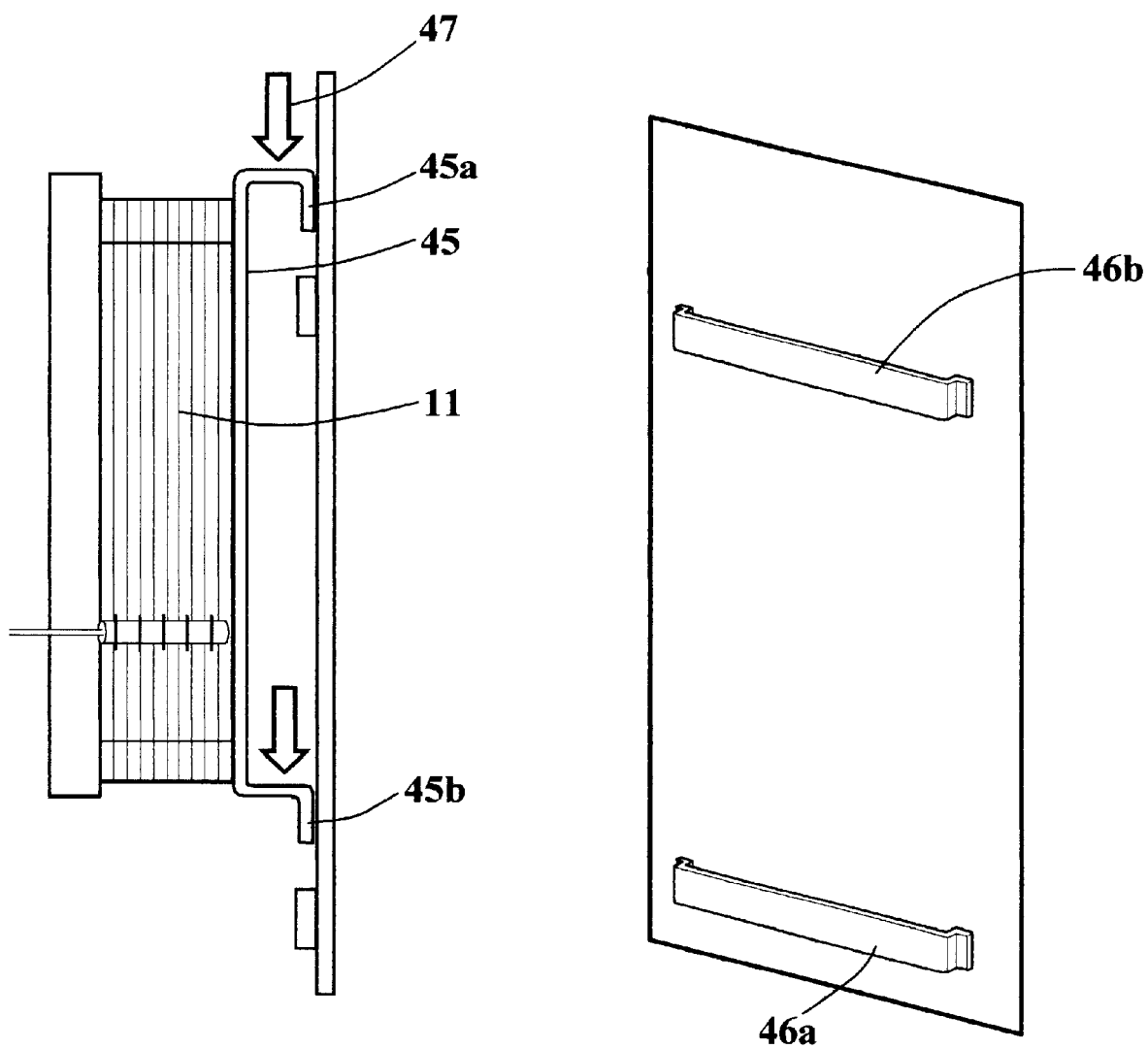
FIG. 8 is a perspective view of an electrolysis cell having a modified rear panel for hanging on the rear wall of the cabinet or housing.
Figure 9:
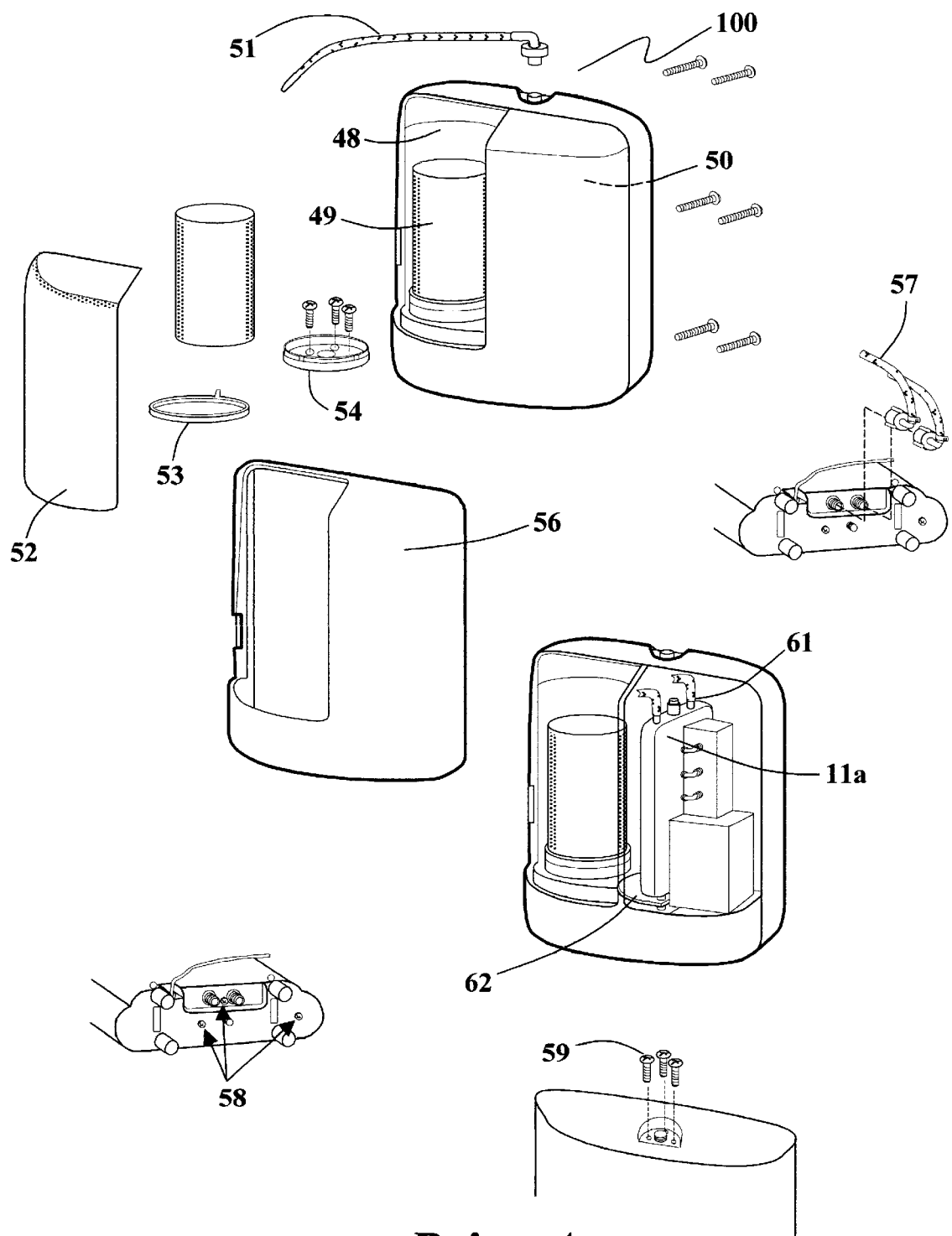
FIG. 9 is a perspective view of a prior art portable electrolysis system showing all the parts and its assembly.

A vital improvement of the claimed invention is to provide a quick connect/disconnect means for the electrolysis cell 11 from the separate compartment 26 or from a cell holder in general. FIGS. 3, 4, 5A, 5B, 7 and 8 show the different ways of achieving this. FIG. 3 shows the electrolysis cell in a platform 37. It is preferable to construct the platform with the same material as the cell 11 which are usually made of hard plastic or metal. In this design, the cell is attached to the platform preferably by using an adhesive or a glue of the same or similar chemical composition as the plastic material making up the cell and the platform. For example, if the cell and the platform are made of polyvinyl chloride, a polyvinyl base adhesive will be used to glue the cell to the platform. If the cell is made of metal, welding the part or other conventional methods of attachments can be used. The platform 37 is made up of two members, a male 37a and a female 37b. FIGS. 3 and 4 show a male member 37a, the male member directly attached to the cell, connecting to a female member 37b by means of a screw-on mechanism. On FIGS. 5A and 5B, the male member 38a connects with the female member 38b through a twist and lock mechanism. In an example of a twist and lock mechanism shown in FIGS. 5A and 5B, the male member 38a attached to the base of the cell 11 has a slot 39 matching a protrusion 40 overhanging the peripheral top surface of the female member 38b. To lock the cell in place, the male member drops into the female member through the slot 39 and once the male member occupies the circumferential area of the female member 38b, the cell is twisted along with the male member, moving the slot away from the protrusion, thereby superimposing the protrusion over a flat surface of the male member to lock the cell in place. The male member 38a may be solid or may have a hollow interior with solid surfaces or a solid top surface with an open base. Other twist and lock mechanisms following this concept and purpose will work equally well. Another way of easily removing and introducing the cell into the separate compartment 26 is to modify the rear panel 41 of the cell pressing on the end 42 opposite the front panel 27 of the cell. The rear panel is preferably made of metal. As shown in FIG. 7, the rear panel is preferably L-shaped with a vertical and a horizontal member. To attach the cell into the separate compartment, sliding tracks 43a or clip-ons 43 are installed on the rear end of the bottom wall or base 44 of the compartment 26 or on a cell holder in general where the horizontal member 41a of the rear panel 41 can be secured by sliding into or clipping into the tracks or clip-ons, respectively. The horizontal member extend from a bottom edge of the vertical member if the sliding tracks or clip-ons are at the base of the compartment. As shown in FIGS. 7A and 7B, these tracks 43a or clip-ons 43 can be any number and may also be designed to cover the entire length of the horizontal member 41a. A much simpler and quicker means is shown in FIG. 8. In this design, the electrolysis cell is constructed with a rear panel 45 having a hook 45a on one end which in this illustration is on the top end and an inverted L 45b which in this illustration is on the bottom end, the hook 45a preferably in a coaxial orientation as the inverted L 45b to keep the cell from tilting. Tilting of the cell affect the outward flow of the liquids and gases produced during the process. The cell, as shown in FIG. 8 can be easily attached and detached by slipping the inverted L bottom end 45b into a bottom receiving bracket 46a and hooking the top end 45a into a top receiving bracket 46b. It is also possible to reverse the positions of the hook and the inverted L with minor adjustments that is easily derived from the example as shown. In this design, there should be a suitable clearance 47 above the top receiving bracket 46b to accommodate the cell prior to slipping this into these brackets. Further, it is important for the hook and the inverted L to snuggle fit into the receiving brackets to prevent movement of the cell during the Electrolyzed water used in the home primarily for drinking are housed in a more portable cabinet or housing and are preferably constructed with hard plastic. The current housing for these portable electrolysis system suffer from the same problem experienced with the commercial units described above. The electrolysis cell is likewise housed in a common compartment along with the other components of the electrolysis system such as the valves, tubings, hoses, flow sensors, electrical connectors, power control units, microprocessors and accessories. Because of the desire to make the system portable, the power source, circuits and any computer devices which are usually enclosed in a separate compartment are normally also housed in the same common compartment, thereby making it even more difficult to replace the cell when its designated operational process or usage. lifetime has expired. In the present system 100, as typically exemplified by Model Nos. TYH-31, TYH-51, TYH-81, TYH-91, and TIS-702 of Toyo Systems, a separate compartment 48 typically house a filter member 49, with the rest of the components all squeezed into a main compartment 50. As shown in FIG. 9, even if the filter member 49 is in a separate compartment, this has to be removed from the unit before the main compartment enclosing the electrolysis cell can be opened. To remove the filter member 49, as shown in FIG. 9, one has to disconnect the flexible electrolysis water hose 51 from the system housing 100. To access the electrolysis cell 11a, the cover 52 of the filter compartment 48 has to be removed. If the filter member 49 is secured by a locking ring 53, this is first unlocked and removed before the filter member 49 can be released. The filter member base 54 has to be detached and the screws at back holding the front cover 56 have to be removed to expose the interior of the main compartment 50. Even after the interior is exposed, further steps need to be done before the electrolysis cell can be replaced. These are, the bottom back water hoses 57 have to be disconnected, the bottom screws 58 and the top screws 59 holding the cell have to be disengaged as well as the electrical connectors 60, the hose clamp 61, and the screws (not shown) securing the platform 62 holding the cell 11a. Such steps are tedious and discourages an operator to replace the cell 11a even if it is required to ensure optimum performance.

Figure 10:
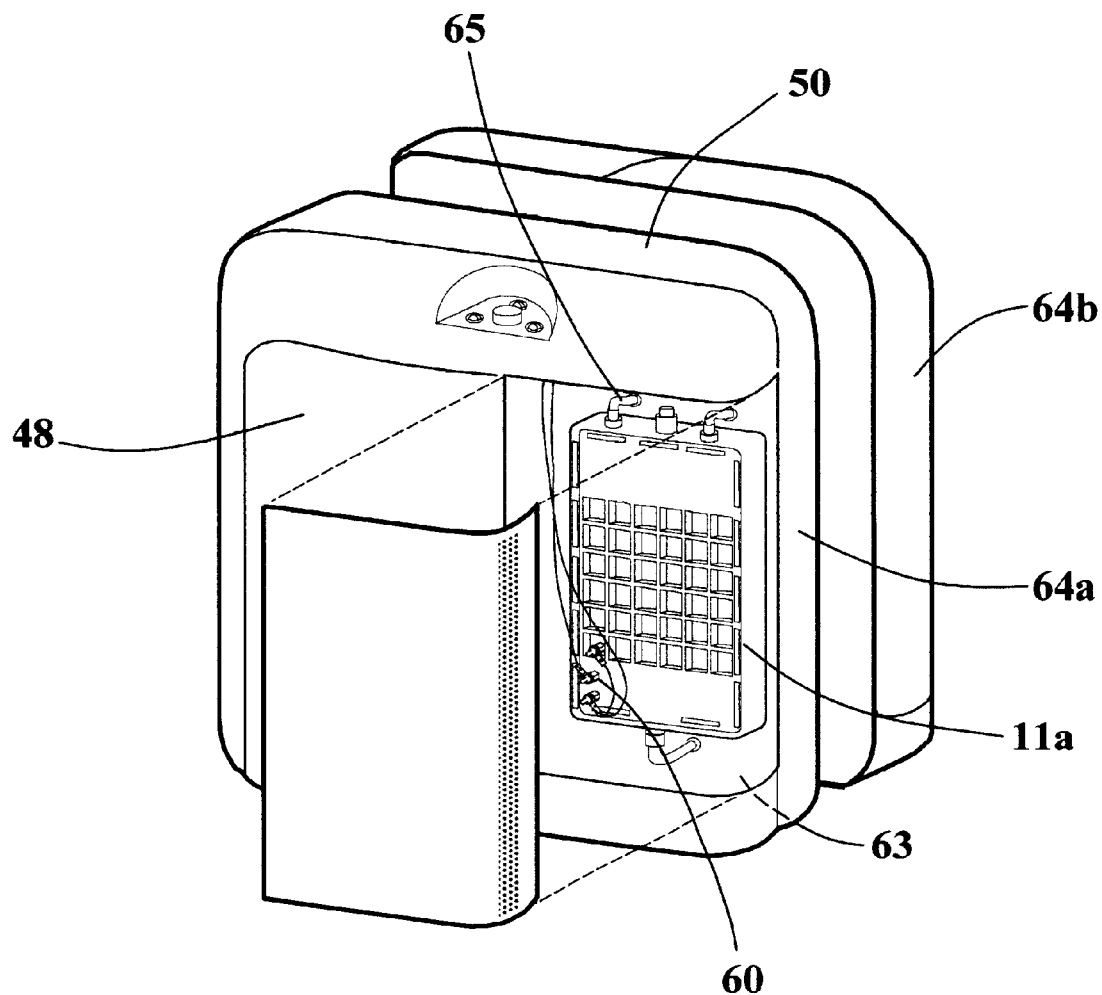
FIG. 10 is an exploded perspective view of the proposed portable electrolysis system.

In the claimed invention as shown in FIG. 10, the filter member 49 is maintained in the separate compartment, hereinafter referred to as filter compartment 48, but a third compartment 63 separate and different from the main compartment 50 and the filter compartment 48 is constructed to house the electrolysis cell following the same concept as that proposed for the commercial unit described above. This third compartment 63 referred to as cell compartment 63 may be constructed at the same side as or opposite that of the filter compartment 48. Unlike the commercial unit, the portable unit usually has only a front panel or front side 64a and a back panel or back side 64b snapped together as shown in FIG. 10. However, like the commercial unit, the electrolysis cell 11a connects with the tubings and electrical connectors from the main compartment 50 through openings 65 on a wall common to the third compartment and the main compartment. Likewise, for this portable electrolysis system, it is proposed to use the same types of connectors for quick connect/disconnect of the electrolysis cell with the rest of the components and to use the modified electrolysis cells having the different means for quickly connecting and disconnecting the cell to its holder such as the cell in a platform or the cell with modified rear panels. The screws used for the portable and commercial housings described herein are preferably the self tapping screws.

While the examples above are directed to the electrolysis systems for producing electrolyzed water involving the passage of an electric current through a mixture of brine and water, an electrolysis cell as used herein also includes cells employed for similar technologies involving the passage of an electric current through other types of mixtures. Consequently, the claimed invention is directed to all types of electrolysis cells and any process cells of similar design that needs periodic replacements. These process cells are within the scope of this invention and are included within the term electrolysis cell and may be modified in the same manner as illustrated and housed similarly. Further, although the examples and illustrations show only one electrolysis cell, the compartment may hold more than one cell.

While the embodiment of the present invention has been described, it should be understood that various changes, modifications and adaptations may be made therein without departing from the spirit of the invention and the scope of the appended claims. Those skilled in the art will recognize that other and further variations of the values presented herein are possible. The scope of the present invention should be determined by the teachings disclosed herein, the appended claims and their legal equivalents.

We claim:

1. A housing for an electrolysis system allowing quick fastening and detaching of an electrolysis cell needing periodic replacement, the electrolysis cell having a front side and a rear side holding an anode and a cathode chamber, comprising:
   a main compartment enclosing components of the electrolysis system except the electrolysis cell; and,
   a separate compartment for the electrolysis cell, the separate compartment having a top wall, a bottom wall, three side panels, and an open side for easily reaching to and grasping on the electrolysis cell, the open side having an optional door to open or close the compartment, the wall or side panel common with the main compartment having openings to accommodate and allow tubings and electrical connectors from the main compartment to couple with tubings and electrical connectors on a side of the electrolysis cell, the separate compartment having a cell holder means for easily removing and introducing the electrolysis cell from the separate compartment, the cell holder means comprising a female member platform and a male member platform, one member platform on the separate compartment for attachment to a matching member platform attached to the electrolysis cell, the female member attaching to the male member by a screw-on mechanism or a twist and lock mechanism.

2. The housing of claim 1 wherein the twist and lock mechanism comprises a slot at the male member matching a protrusion on the female member, the male member engaging into the female member through the slot and the protrusion superimposing over a flat surface of the male member after twisting to lock the electrolysis cell in place.

3. The housing of claim 1 wherein the male member is of solid material.

4. The housing of claim 1 wherein the male member has a solid top surface with an open base or a solid surface with a hollow interior.

5. The housing of claim 1 further comprising additional compartments for enclosing other components of the electrolysis system and means for communicating the electrolysis cell to the other components of the electrolysis system.

6. The housing of claim 5 wherein the means for communicating the electrolysis cell to the other components of the electrolysis system include quick connect fittings, quick disconnect couplings, male elbow swivels and snap in elbows for the tubings and quick disconnect snap-on and terminal spade connectors for the electrical connectors.

7. The housing of claim 1 wherein the electrolysis cell includes a chamber or a series of chambers.

8. The housing of claim 1 wherein the optional door is a swinging, sliding or clip-on door.

9. The housing of claim 1 wherein the electrolysis cell and the housing is made of metal or hard plastic.

10. A housing for a system involving passage of electric current allowing quick fastening and detaching of a process cell needing periodic replacement, the process cell having a front side and a rear side holding an anode and a cathode chamber, comprising:
    a main compartment enclosing components of the system except the process cell; and,
    a separate compartment for the process cell, the separate compartment having a top wall, a bottom wall, side panels, and an open side for easily reaching to and grasping on the process cell, the open side having an optional door to open or close the compartment, the wall or side panel common with the main compartment having openings to accommodate and allow tubings and electrical connectors from the main compartment to couple with tubings and electrical connectors on a side of the process cell, the separate compartment having a cell holder means for easily removing and introducing the process cell from the separate compartment, the cell holder means comprising a female member platform and a male member platform, one member platform on the separate compartment for attachment to a matching member platform attached to the electrolysis cell, the female member attaching to the male member by a screw-on mechanism or a twist and lock mechanism.

11. The housing of claim 10 wherein the twist and lock mechanism comprises a slot at the male member matching a protrusion on the female member, the male member engaging into the female member through the slot and the protrusion superimposing over a flat surface of the male member after twisting to lock the electrolysis cell in place.

12. The housing of claim 10 wherein the male member is of solid material.

13. The housing of claim 10 wherein the male member has a solid top surface with an open base or a solid surface with a hollow interior.

14. The housing of claim 10 further comprising additional compartments for enclosing other components of the system and means for communicating the process cell to the other components of the system.

15. The housing of claim 14 wherein the means for communicating the process cell to the other components of the system include quick connect fittings, quick disconnect couplings, male elbow swivels and snap in elbows for the tubings and quick disconnect snap-on and terminal spade connectors for the electrical connectors.

16. The housing of claim 10 wherein the process cell includes a chamber or a series of chambers.

17. The housing of claim 10 wherein the optional door is a swinging, sliding or clip-on door.

18. The housing of claim 10 wherein the process cell and the housing is made of metal or hard plastic.

19. A housing for an electrolysis system allowing quick fastening and detaching of an electrolysis cell needing periodic replacement, the electrolysis cell having an anode and a cathode chamber, comprising:

a main compartment having a front side and a back side enclosing components of the electrolysis system except an electrolysis cell and a filter member;

a second compartment enclosing the filter member;

a third compartment enclosing the electrolysis cell separated from the main and second compartment, the third compartment having an optional door;

a common wall between the main compartment and the third compartment having openings to accommodate and allow tubings and electrical connectors from the main compartment to couple with tubings and electrical connectors of the electrolysis cell; and, a cell holder means on the third compartment for easily removing and introducing the electrolysis cell from the third compartment, the cell holder means comprising a female member platform and a male member platform, one member platform on the third compartment for attachment to a matching member platform attached to the electrolysis cell, the female member attaching to the male member by a screw-on mechanism or a twist and lock mechanism.

20. The housing of claim 19 wherein twist and lock mechanism comprises a slot at the male member matching a protrusion on the female member, the male member engaging into the female member through the slot and the protrusion superimposing over a flat surface of the male member after twisting to lock the electrolysis cell in place.

21. The housing of claim 19 wherein the tubings and electrical connectors communicating the electrolysis cell to the other components of the electrolysis system include quick connect fittings, quick disconnect couplings, male elbow swivels and snap in elbows for the tubings and quick disconnect snap-on and terminal spade connectors for the electrical connectors.

* * * * *